June 15, 1965 D. M. VANDER STOEP 3,189,121
VACUUM SEISMIC PULSE GENERATOR
Filed June 29, 1962 2 Sheets-Sheet 1

INVENTOR:
DEAN M. VANDER STOEP
BY *Theodore E. Bieber*
HIS ATTORNEY

INVENTOR:
DEAN M. VANDER STOEP
BY: Theodore E. Bieber
HIS ATTORNEY

3,189,121
VACUUM SEISMIC PULSE GENERATOR
Dean M. Vander Stoep, Houston, Tex., assignor to Shell Oil Company, New York, N.Y., a corporation of Delaware
Filed June 29, 1962, Ser. No. 206,275
1 Claim. (Cl. 181—.5)

This invention relates to seismic sound sources and more particularly to a mechanical seismic sound source as contrasted to sound sources using explosives and the like.

In the past, it has been suggested that a large weight could be elevated and then dropped to generate seismic impulses. While the weight dropping technique has been successful, it does have several disadvantages. For example, it requires the handling of a large dynamic weight with the attendent problems and danger. Also the weight tends to to tilt slightly as it falls and therefore impacts the ground at an angle, resulting in a smeared and less efficiently produced seismic signal. In addition since this tilt varies from drop to drop, the outgoing signals are not uniform. Furthermore, the weight falls on a free earth surface resulting in a considerable portion of the available energy being dissipated in inelastically deforming the earth. In addition, the velocity of the weight at impact is relatively low resulting, in many cases, in generation of a less sharp seismic signal than desired. This terminal velocity is determined directly by the height of the drop, which in practical field equipment, is limited to about ten feet.

In addition to the falling weight type of seismic pulse devices it has also been suggested that a compressed spring could be used to drive a hammer downwardly to strike the ground to generate an impulse. While this arrangement would overcome some of the difficulties of the dropping weight technique, it creates additional problems.

Accordingly, it is the principal object of this invention to provide an improved seismic pulse generating device that produces relatively uniform seismic pulses.

A further object of this invention is to provide an improved seismic pulse generator in which a piston is driven downwardly through a cylinder by the force of atmospheric pressure working against a vacuum on the opposite side of the piston to provide much higher terminal velocities, and therefore sharper pulses, than can be achieved by prior devices.

A further object of this invention is to provide an improved seismic pulse generator in which the falling piston impacts an internal surface that is coupled to a diaphragm or plate pressed firmly against the earth's surface by a large force to provide coupling to the earth to insure that a large proportion of available energy is converted into seismic energy.

A still further object of this invention is to provide an improved seismic pulse generator of the type in which a piston is driven downwardly to generate a seismic pulse and having a lower assembly which provides an impact surface that does not permanently deform and dampens or allows the earth to dampen vibrations of the piston after impact.

The above objects and advantages of this invention are achieved by providing a seismic pulse generator having a cylinder with a free piston disposed therein. The upper end of the cylinder is open to the atmosphere while the lower end of the cylinder is closed by a lower assembly having an impact surface formed by the top of a confined fluid instead of a solid material to prevent damage to the piston. The bottom surface of the lower assembly is pressed firmly against the ground by a large force as for example the weight of the truck resting upon the seismic pulse generator. In addition, the lower end of the cylinder communuicates with a vacuum reservoir and a vacuum pump. The free piston is held in position at the top of the cylinder while the portion of the cylinder below the piston is evacuated. The piston is then released and the atmospheric pressure drives the piston downwardly against the vacuum. When the piston impacts upon the upper fluid surface, it generates a seismic pulse which is transmitted to the earth through the lower assembly. The tendency of the free piston to vibrate is dampened by the earth and the residual vacuum remaining in the vacuum reservoir.

In order to change the impacting velocity without appreciably changing the total energy one only has to change the mass of the free piston. Thus, since the stroke of the piston and the driving force are relatively fixed, the impacting velocity will change as the mass of the piston is varied. The total energy generated in each seismic pulse can be varied by varying the piston stroke or alternatively by varying the amount of vacuum created in the cylinder.

The above objects and advantages of this invention will be more easily understood from the following detailed description of two embodiments when taken in conjunction with the attached drawings in which.

Figure 1:
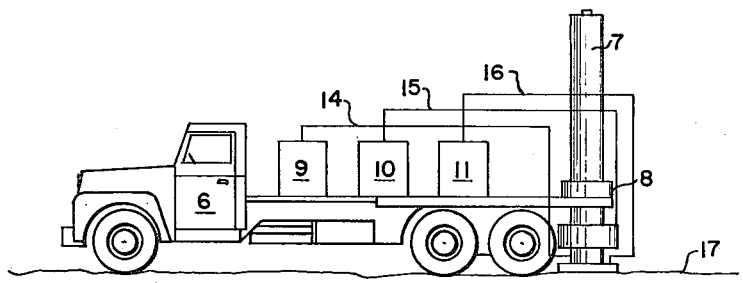
FIGURE 1 shows a seismic pulse generator constructed in accordance with invention installed on the rear of a truck.

Referring now to FIGURE 1, there is shown a truck 6 having a seismic pulse generator 7 construucted according to this invention mounted on the rear thereof. The mounting provides a hydraulic system 8 to raise the seismic pulse generator off the ground when the truck is moved to a new location, and to lift the weight of the truck onto the generator in its operating position. Also mounted on the truck are a compressed air system 9, a vacuum system 10, and a second hydraulic system 11 that are coupled to the seismic pulse generator 7 by means of conduits 14, 15 and 16, respectively. The purpose and operation of the compressed air system, vacuum system, and the hydraulic system 11 will be more fully described and explained below with reference to FIGURE 2. The truck 6 should be relatively heavy in order to hold the seismic pulse generator 7 in contact with the surface of the earth 17. In some cases it may be desirable to add weight to the truck to ensure that the seismic pulse generator remains in contact with the surface of the earth.

Figure 2:
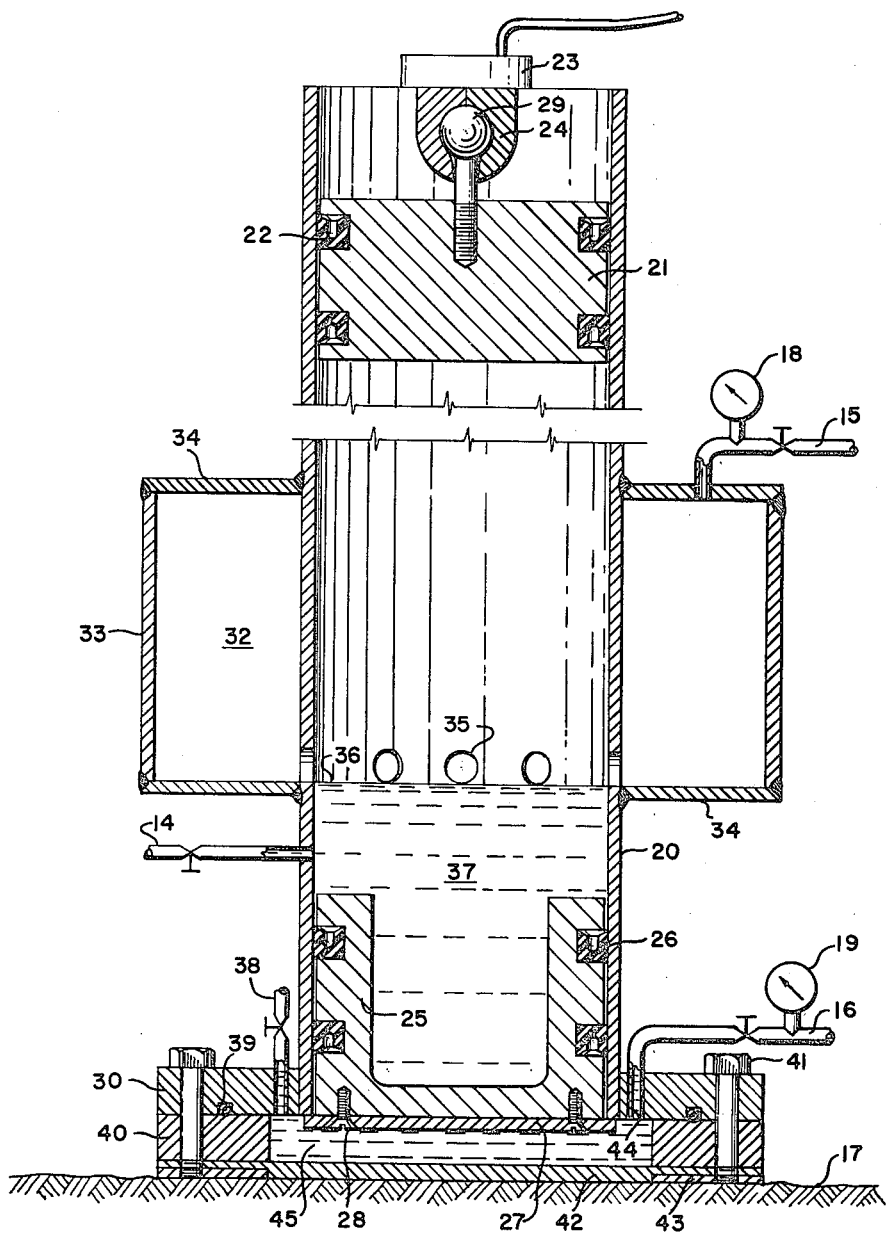
FIGURE 2 shows a cross section of one embodiment of the seismic pulse generator shown in FIGURE 1; and, FIGURE 3 shows a cross section of a second embodiment of the seismic pulse generator shown in FIGURE 1.

Referring now to FIGURE 2, there is shown a vertical section of the seismic pulse generator 7 showing the construction details thereof. The seismic pulse generator utilizes a cylinder 20 open to the atmosphere at its upper end and having a free piston 21 disposed therein. The free piston is sealed to the inner wall of the cylinder 20 by means of U-seals 22 placed in grooves formed in the piston wall. The upper end of the cylinder is also provided with an electrically operated latch 23 for holding the piston at the upper end of the cylinder until the time it is desired to release the piston to create a seismic pulse. The latch may be fastened to the upper end of the cylinder by any desired means not shown in FIGURE 2. The latch may be of any desired construction for example a pair of spring-loaded jaws 24 that engage a ball member 29 projecting from the top of the piston 21. The jaws are disposed to be opened electrically as by means of a solenoid.

The lower end of the cylinder 20 is provided with an outwardly extending radial flange 30. The radial flange may be secured to the end of the cylinder by any desired means such as welding or the like. The lower end of the cylinder is closed by means of a lower piston 25, which is sealed to the inner wall of cylinder 20 by means of U-seals 26 placed in grooves formed in the piston wall. Piston 25 is contained from moving upward in cylinder 20 by means of a plate 27, slightly larger than the inside diameter of the cylinder, fastened to piston 25 by screws 28. This assembly is preferably made as light as possible to reduce its inertia.

The lower portion of the cylinder 20 is surrounded by a vacuum reservoir 32, whose wall 33 is formed by a cylinder, and whose ends 34 are formed from flat stock. This assembly is welded together which, in turn, is welded to cylinder 20. In addition the vacuum reservoir is provided with a vacuum gage 18. The lower portion of the cylinder 20 communicates with the vacuum reservoir 32 by means of a series of ports 35.

The lower portion of the cylinder 20 is filled with a fluid 37, for example oil, to the approximate level 36 adjacent to the lower edge of the ports 35. Compressed air conduit 14 communicates with the oil 37.

A spacer ring 40 is sealed to the flange 30 by means of a O-ring seal 39. A flexible diaphragm 42 is secured to the lower surface of the spacer ring 40 by a retaining ring 43 with the assembly being held together by a plurality of circumferentially spaced bolts 41. The flexible diaphragm 42 is spaced from the lower surface of plate 27 that closes the lower end of the cylinder 20. The space between the diaphragm and plate is filled with oil 45 from the hydraulic system 11 by means of the conduit 16. The conduit 16 communicates with a port 44 formed in the flange 30 with gauge 19 being provided to measure the pressure of oil 45. Bleeder conduit and valve 38 communicate with the space between plate and diaphragm.

To operate the seismic pulse generator described above, the space between plate 27 and diaphragm 42 is first filled with oil 45 through conduit 16 and port 44. As this space is being filled, the entrapped air is allowed to escape through bleeder valve 38 which is then closed after oil begins to flow from it. The oil pressure is increased to a suitable value to insure firm coupling of diaphragm 42 to the surface of the earth 17. This pressure is noted on gauge 19. The oil being a relatively incompressible fluid insures that the impact of the piston 21 on the oil surface 36 will be transmitted directly to the earth. Next, the free piston 21 is suspended in the upper end of the cylinder 20 by means of latch 23. After the free piston is latched in the upper end of the cylinder 20, the cylinder 20 is evacuated by means of the vacuum system 10 with the amount of vacuum being noted on gauge 18. Once the cylinder is evacuated the seismic pulse generator is ready for operation. When it is desired to generate the seismic pulse the piston 21 is released by opening the latch 23 and driven downward by the force of the atmospheric pressure acting on its upper surface. When the piston strikes the oil surface 36, it will create a seismic pulse that is transmitted through oil 37, lower piston 25, plate 27, oil 45, and diaphragm 42 to the surface of the earth 17. The piston will be prevented from vibrating due to the damping of the earth and the vacuum remaining in the system. Since it is impossible to create a perfect vacuum, the vacuum reservoir 32 must be sufficiently large in volume to limit the pressure build up in the cylinder 20. A reasonable figure for the vacuum reservoir volume is approximately one-third that of cylinder 20. The piston 21 is returned to latch 23 at the top of cylinder 20 by closing the valve on vacuum conduit 15, and opening the valve on compressed air conduit 14. This air pressure bubbling through oil 37 forces the piston upward until it catches in the latch. The air is brought in below oil surface 36 in order to break the surface tension that initially clamps piston 21 to oil surface 36. After piston 21 is latched, the compressed air valve is closed, the vacuum valve is opened and the system is ready to repeat the operation.

Of course, the procedure can be automated to facilitate rapid cycling of the vacuum pulse generator so that rapid and economical seismograph surveys may be obtained.

Figure 3:
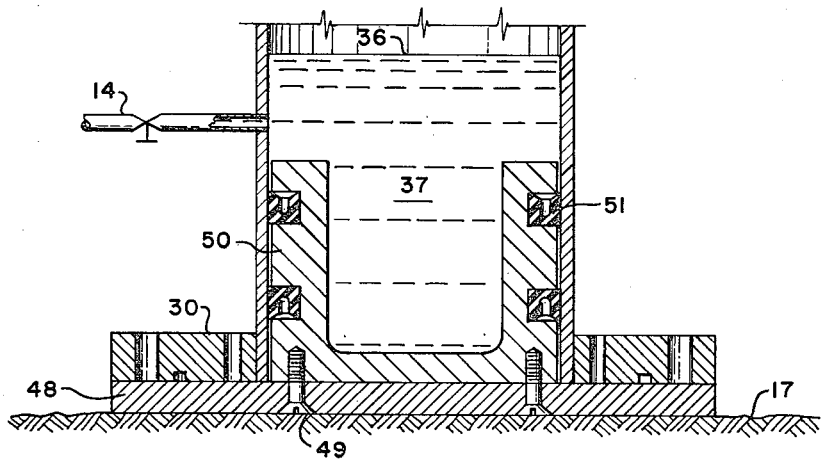

An alternative embodiment of the invention is shown in FIGURE 3. The embodiment shown in FIGURE 3 is similar to the embodiment shown in FIGURE 2 except for the construction of the lower assembly of the cylinder. Accordingly, to simplify the description only the lower assembly of the cylinder is shown.

Referring to FIGURE 3, plate 48 is fastened directly to a lower piston 50 by means of screws 49. The piston 50 is provided with sealing rings 51 disposed in grooves formed in the wall of the piston 50. Plate 48 is pressed firmly on the surface of the earth 17 by the weight of truck 6 on the pulse generator 7. The operation is exactly as described before except that the pulse created by piston 21 striking oil surface 36 is transmitted through oil 37, lower piston 50, and plate 48 to the surface of the earth 17.

From the above description of the construction and operation of the seismic pulse generator of this invention, it can be appreciated that it provides seismic pulses having uniform characteristics that can be repeated as many times as desired. This result is achieved by insuring good coupling between the pulse generator and the earth through the use of either the flexible diaphragm with oil filling the space between the flexible diaphragm and plate 27, or plate 48 pressed directly on the earth's surface. Likewise, the weight of the piston remains constant and the force used for driving it downward to generate the pulse is nearly constant. The force and the constancy that is used for driving the piston is of course dependent upon the degree of vacuum applied to the cylinder 20. If it is desired to change the impacting velocity of the piston 21 on the oil surface 36 without appreciably changing the total energy it may be easily accomplished by changing the weight of the piston 21. This invention also eliminates the need for handling a large dynamic weight as in the case of weight dropping devices and provides nearly constant acceleration for the piston 21.

I claim as my invention:

A seismic pulse generator for use in surveying land areas, said source comprising:

a vertical cylinder having a free piston disposed therein, said cylinder being open to the atmosphere at the upper end and closed at the lower end by a restrained piston, said restrained piston being free to move out of said cylinder but restrained from moving into said cylinder;

a flexible diaphragm secured to said lower end of the cylinder and spaced from the end of said restrained piston;

a reservoir, said reservoir communicating with said cylinder through a series of circumferentially spaced ports, said ports being disposed above the upper edge of said restrained piston;

a non-compressible fluid, said fluid filling the lower end of said cylinder to the end of said ports;

a vacuum producing means, said reservoir being coupled to said vacuum producing means;

a second non-compressible fluid, said second fluid filling the space between said flexible diaphragm and said restrained piston;

conduit means communicating with said cylinder above said restrained piston, said conduit means in addition being coupled to a source of gas under pressure whereby said free piston may be raised in said cylinder;

a latch means disposed on the upper end of the cylinder and adapted to hold said free piston at the upper end of the cylinder, said latch means in addition having a means to release said free piston and permit it to be driven downwardly by atmospheric pressure acting on the upper surface and a vacuum on the lower surface.

References Cited by the Examiner
UNITED STATES PATENTS

| | | | |
|---|---|---|---|
| 1,753,368 | 4/30 | DuBois-Reymond et al. | 340—12 |
| 3,024,861 | 3/62 | Clynch | 181—.5 |

FOREIGN PATENTS 608,169  11/60  Canada.

SAMUEL FEINBERG, *Primary Examiner.*
CHESTER L. JUSTUS, *Examiner.*